April 26, 1932.  J. A. R. DUBROCA  1,855,949
VEHICLE WHEEL RAISING DEVICE
Filed Feb. 2, 1931  3 Sheets-Sheet 1

J. A. R. Dubroca, INVENTOR
BY Victor J. Evans
ATTORNEY

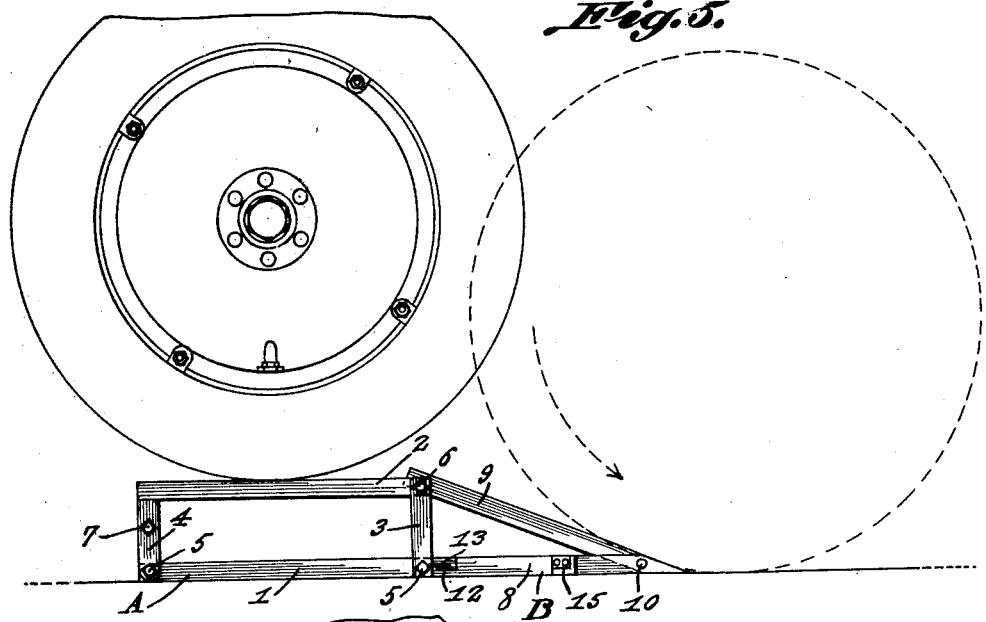
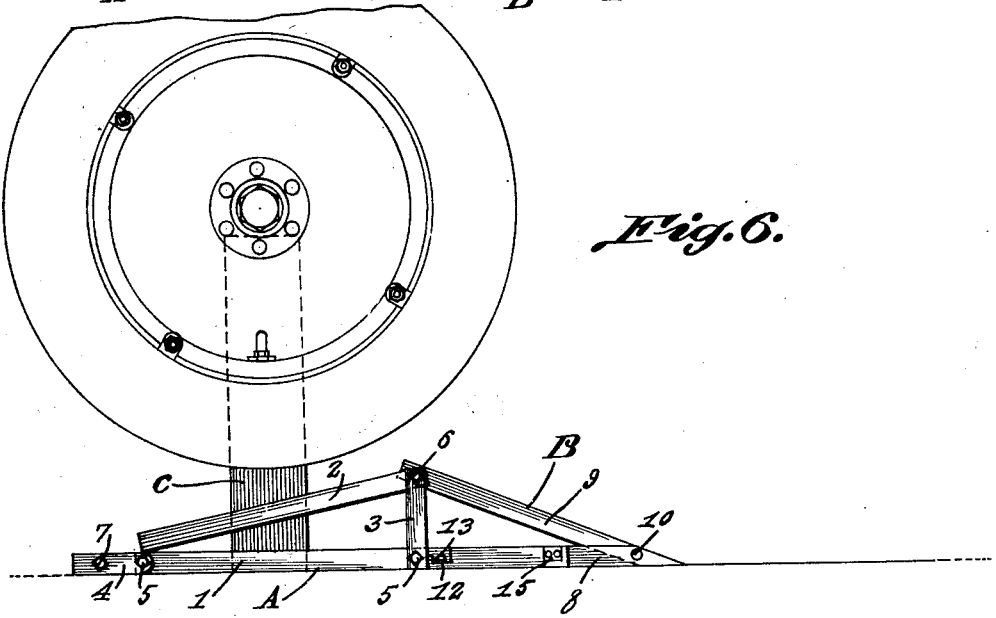

April 26, 1932.  J. A. R. DUBROCA  1,855,949
VEHICLE WHEEL RAISING DEVICE
Filed Feb. 2, 1931  3 Sheets-Sheet 3
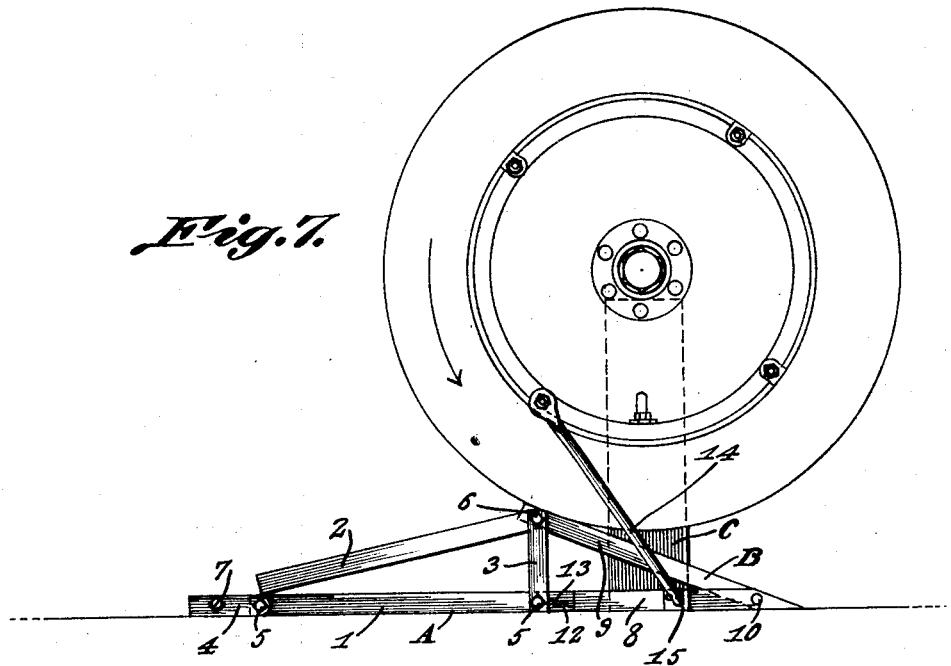
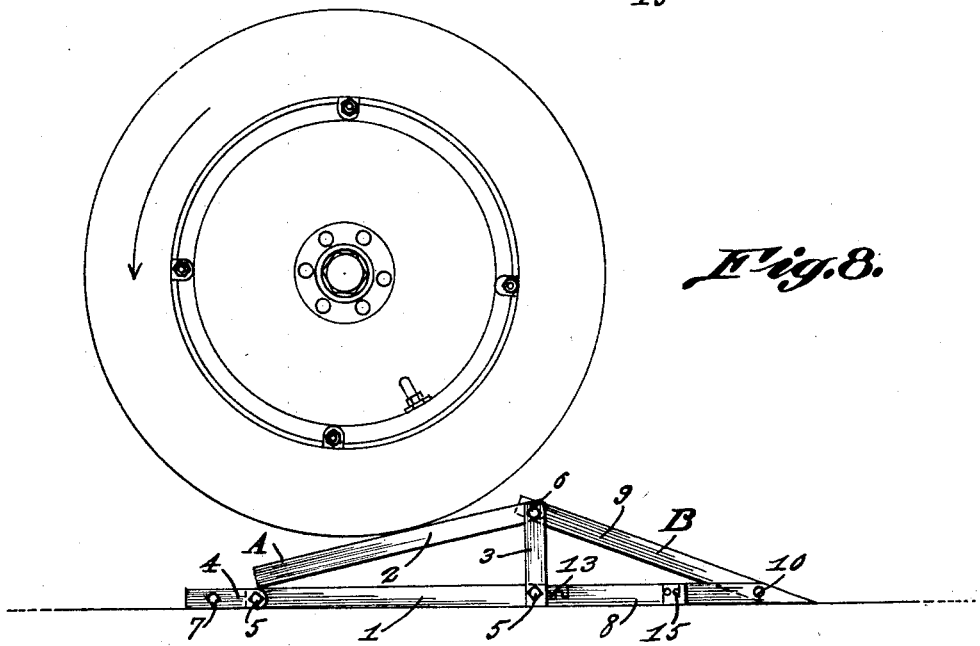
J. A. R. Dubroca, INVENTOR
BY Victor J. Evans
ATTORNEY Patented Apr. 26, 1932

1,855,949

UNITED STATES PATENT OFFICE

JOSE A. RODRIGUEZ DUBROCA, OF VEDADO, CUBA

VEHICLE WHEEL RAISING DEVICE

Application filed February 2, 1931. Serial No. 512,958.

This invention relates to a lifting device for the wheel of a vehicle, the general object of the invention being to provide a frame having an inclined part so that one wheel of the vehicle can run up said inclined part on to another part of the frame, with means whereby the wheel supporting part of the frame can be lowered from under the wheel after the wheel has been supported by another member, so that the wheel can be run off the device or the device can be removed from under the wheel.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 5 is a view showing how a wheel is supported by the device.

Figure 6 is a view showing the wheel supported by the upright and the device collapsed so that it can be removed from under the wheel.

Figure 7 is a view showing how the wheel can be caused to run off the device.

Figure 8 is a view showing the wheel running off the device.

Figure 1:
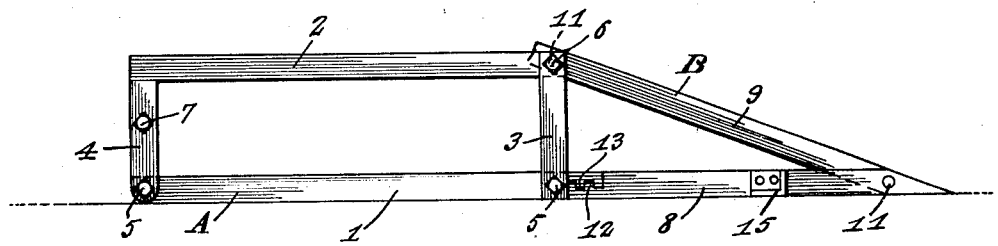
Figure 1 is an elevation of the device.

In these views, the letter A indicates one portion of the device and the letter B another portion thereof, the portion A consisting of the base frame 1, the top frame 2 and the end members 3 and 4. Each end member is fastened to the base frame by the bolts 5 and one end of the frame 2 is fastened to the top of the member 3 by the bolt 6 and the other end of the frame 2 rests on the top of the end member 4, this member 4 having a bolt 7 passing through the same intermediate its ends. The part B consists of a base frame 8 and a frame 9 which is pivotally connected with the outer end of the frame 8, as shown at 10, and this frame 9 is formed with the notches 11 for engaging the bolt 6 of the part A. The inner ends of the side members of the base 8 are toothed, as shown at 12, and the inner ends of the side members of the base 1 of the part A are toothed, as shown at 13, so that when the teeth 12 interlock with the teeth 13 and the notches 11 are placed in engagement with the bolt 6, the parts A and B are detachably connected together, with the frame 9 held in inclined position. Thus a vehicle wheel can run up the frame 9 when the device is placed in front of said wheel and the vehicle moved to cause one wheel to pass up the frame 9 and from the frame 9, the wheel will pass on to the top frame 2 of the part A. Then an upright C is placed under the hub cap or a part of the axle adjacent the raised wheel to support the wheel in raised position and then the member 4 is knocked from under the frame 2, as shown in Figures 6, 7 and 8, so that the wheel will be supported wholly by the upright C, as shown in Figure 6.

After the tire of the wheel has been changed or the wheel otherwise operated on, the part B is placed under the wheel, as shown in Figure 7, and a bar 14 pivotally fastened to one of the lugs of the wheel and its other end placed in the angle iron projection 15 on the frame 8, so that when the vehicle is moved, the wheel is caused to move up the incline 9 and then run down the incline formed by the lowered frame 2, as shown in Figure 8. The bar 14 and the projection 15 prevent the wheel from spinning. Thus a wheel of a vehicle can be easily and quickly raised without the use of a jack and with but little effort on the part of the operator, as the wheel is caused to pass upon the device by the movement of the vehicle by its motor.

Figure 2:
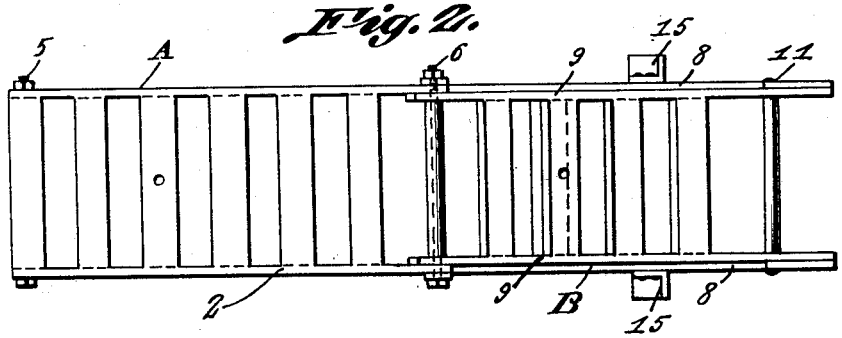
Figure 2 is a top plan view thereof.
Figure 3:
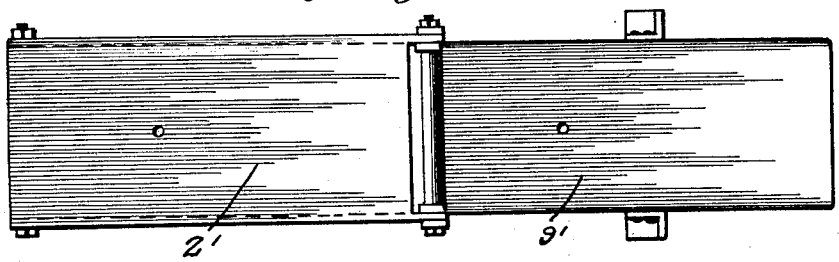
Figure 3 is a top plan view, showing a modification.
Figure 4:
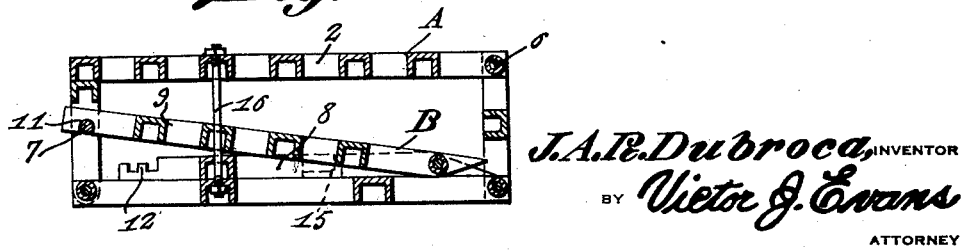
Figure 4 is a sectional view showing the position of the parts when not in use.

The device can be formed of openwork frames, as shown in Figures 1, 2 and 4, or the frames 2 and 9 can be formed of solid portions, as shown at 2' and 9' in Figure 3.

When the device is not in use, the part B is separated from the part A and placed in the part A, as shown in Figure 4, and a bolt 16 passed through portions of the two parts to fasten them together, as also shown in Figure 4.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a body of substantially rectangular form, the said body consisting of upper and lower frame portions connected by end portions, one of the end portions of which can be removed from under the top portion thereof so that said top portion will drop into an inclined position, a second frame consisting of a base and an inclined part pivotally connected with the base, means for detachably connecting the base and inclined part with one end of the rectangular frame, means whereby the base and inclined part can be collapsed and placed in the rectangular frame and a bolt for connecting the rectangular frame and the base and inclined portion together.

In testimony whereof I affix my signature.

JOSE A. RODRIGUEZ DUBROCA.